INVENTOR
JOHN JOHNSTON
BY
Carl Miller
ATTORNEY

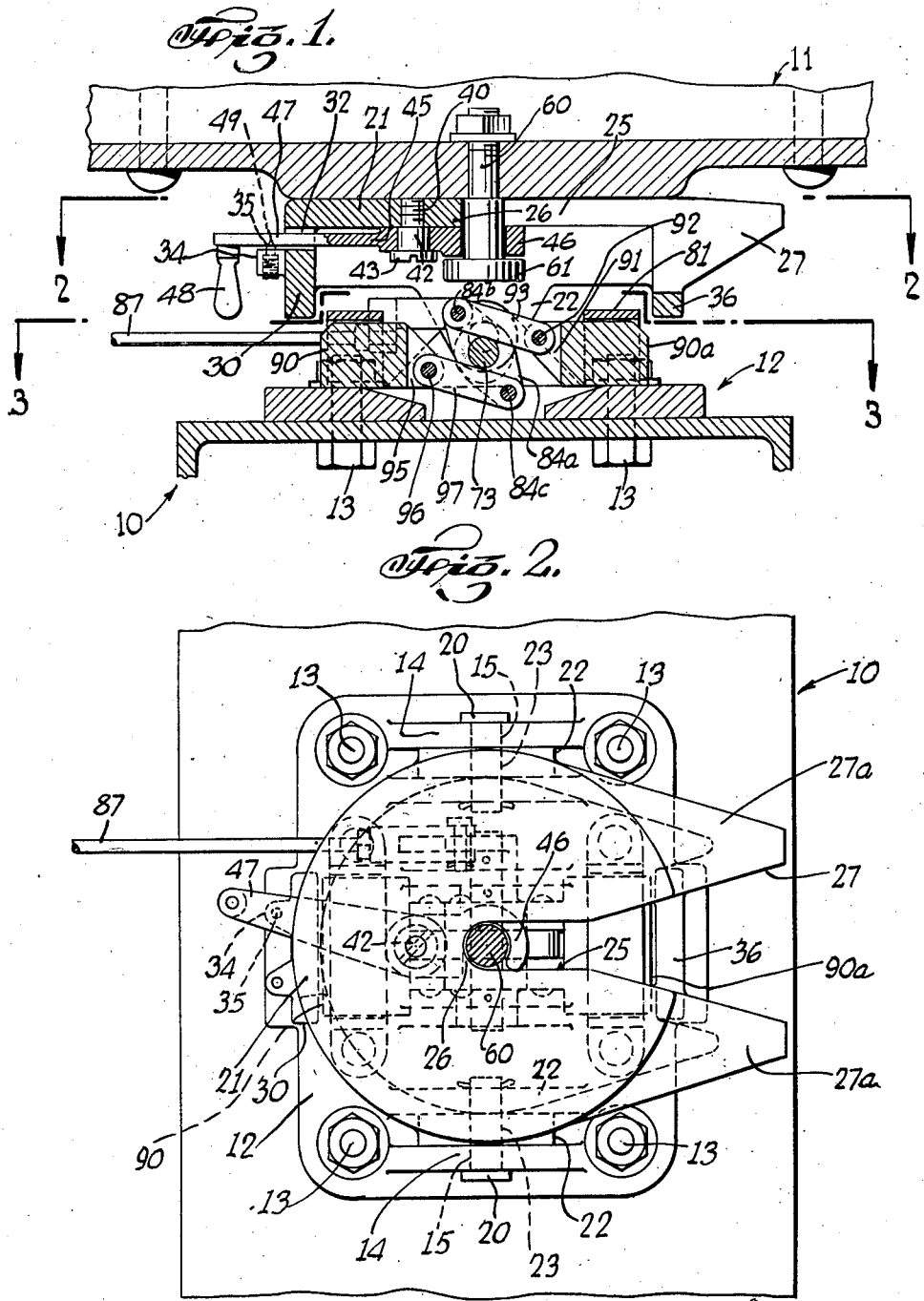

Patented May 25, 1943

2,320,278

UNITED STATES PATENT OFFICE 2,320,278

NONTILTING FIFTH WHEEL

John Johnston, Jersey City, N. J.

Application August 4, 1941, Serial No. 405,336

5 Claims. (Cl. 280—33.1)

This invention relates to anti-tilting devices for trailers. This application is a continuation in part of applicant's co-pending application Serial No. 358,143, filed September 24, 1940, issued on September 30, 1941, as Patent No. 2,257,563.

An object of this invention is to provide a highly improved device of the character described, operable manually by the driver, to prevent tilting of trailers when the trailer is backed up against a curb, and the tractor or truck moves to angular relation relative to the trailer, or whenever the truck or tractor turns relative to the trailer.

A further object of this invention is to provide a strong, rugged and durable trailer or a fifth wheel connection for a truck, having means to prevent tilting of the trailer, and which shall be relatively inexpensive to manufacture, smooth and positive in operation, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is an elevational, cross-sectional view through a trailer connection to a truck or tractor, embodying the invention;

Fig. 2 is a cross-sectional view taken on line 2—2 of Fig. 1;

Figure 3:
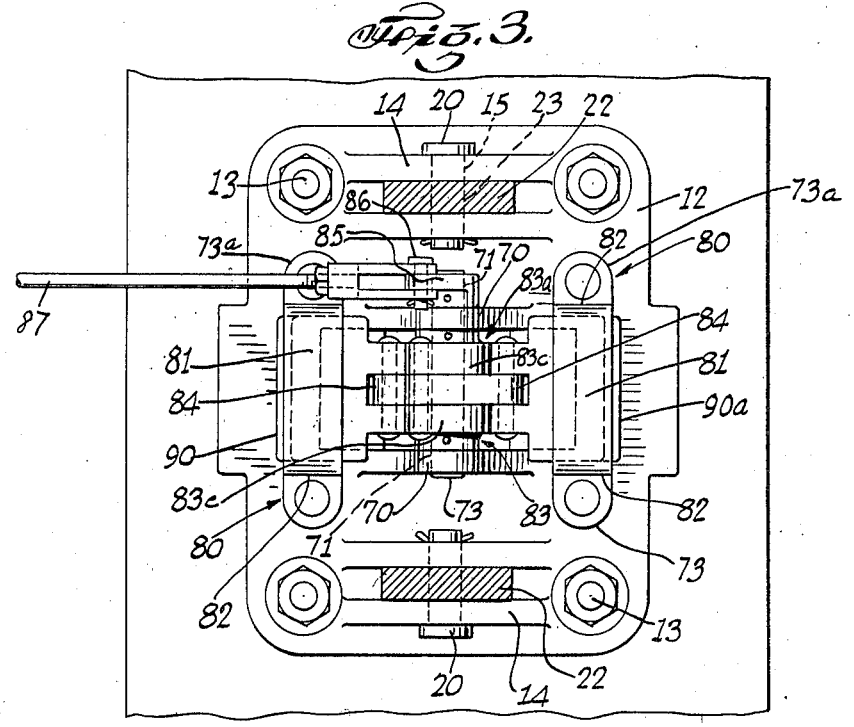
Fig. 3 is a cross-sectional view taken on line 3—3 of Fig. 1.

Referring now in detail to the drawings, 10 designates a frame forming part of a tractor or truck, and 11 designates the trailer. Means is provided to connect the truck or tractor to the trailer. To this end, there is mounted on the frame 10, a base 12 fixed to the frame 10 by means of corner bolts 13. The base 12 is formed adjacent the ends thereof with pairs of parallel bosses 14 formed with aligned bearing openings 15.

Mounted on the bosses 14 and extending through the openings 15 are aligned horizontal pivot pins 20. Mounted on the pivot pins 20 is an annular plate 21 having depending apertured ears 22 received between the bosses 14. The pivot pins 20 pass through aligned bearing openings 23 in the ears 22. Plate 21 is thus mounted on the base 12 for rotation about the axis of the pivot pins 20. Plate 21 is formed with a radial slot 25 extending to the middle of the plate and forming a half bearing 26. Extending from slot 25 is a V-shaped slot portion 27, for the purpose hereinafter appearing.

Extending downwardly from one end of plate 21 is a flange 30 formed with a slot 32. Extending forwardly from flange 30 is a lug 34 on which is mounted a spring pressed plunger 35, for the purpose hereinafter appearing.

Interconnecting the arms 27a of plate 21 which are located on opposite sides of the V-shaped opening 27, is a transverse flange 36. The lower edges of the flanges 30 and 36 are at the same horizontal level, as shown in Fig. 1 of the drawings.

Plate 21 is furthermore formed with a screw threaded opening 40 offset from the axis thereof. Screwed to said opening 40 is a pin 42 formed with a head 43. Pivotally mounted on pin 42 and resting on head 43 in a lever 45 having a hook 46 at one end, for the purpose hereinafter appearing, and also having at its other end an arm 47 extending through slot 32 and formed with a downwardly extending handle 48 at its outer end. Arm 47 is furthermore formed with a small recess 49 to receive the spring pressed plunger 35.

Mounted on the trailer 11 is a king pin 60 having an enlarged head 61 at its lower end. The pin 60 is adapted to move through the V-shaped opening 27, through the slot 25 and into the half bearing 26. Lever 45 may then be rotated so that the hook 46 engages the king pin, thus connecting the trailer to the truck. The trailer rests on plate 21. The spring pressed plunger 35 serves to retain the lever in hook engaging position.

Means is provided to prevent tilting of the trailer relative to the truck whenever it is desired to turn the truck relative to the trailer, as for example, when the trailer is backed up against a curb and the truck is turned so as not to project too far into the street. To this end, there is mounted on the base 12 inwardly of the bosses 14, a pair of parallel brackets 70 formed with aligned bearing openings 71. Mounted on the brackets 70 and received within the openings 71, is a transverse horizontal shaft 73.

Mounted on base 12 furthermore, are a pair of parallel brackets 80 disposed on opposite sides of the shaft 73 and parallel thereto. Each bracket 80 has a top wall 81, side walls 82 and outwardly extending flanges 73 contacting the base 12.

Mounted on and fixed to the shaft 73 are a pair of members 83, 83a, each formed with a lever 83c having opposite extending integral arms 84, 84a. The arms 84, 84a are in alignment and spaced and parallel to one another and are interconnected at their upper and lower ends by transverse pins 84b, 84c. At one end of member 83a is an upstanding arm 85. Arm 85 carries a pivot pin 86 at one end to which there is connected one end of a connecting rod 87, which may be under the control of the driver or operator in the cab of the truck or tractor. Upon pushing the rod 87 forwardly or rearwardly, members 83a and 83 are rotated in one direction or in an opposite direction. Slidably mounted on base 12 and within the brackets 81 are blocks 90, 90a.

Block 90a is formed with a pair of parallel apertured ears 91 carrying a transverse pin 92. Mounted on the pivot pin 92 and received between the ears 91, is one end of a link 93 which is pivoted at its upper end to the pin 84b, said upper end being received between the arms 84. Block 90 is formed with a pair of parallel apertured ears 95 carrying a transverse pin 96. Received between the ears 95 and pivoted at one end to pivot pin 96, is a link 97, the other end of which is pivoted to pin 84c.

Figure 4:
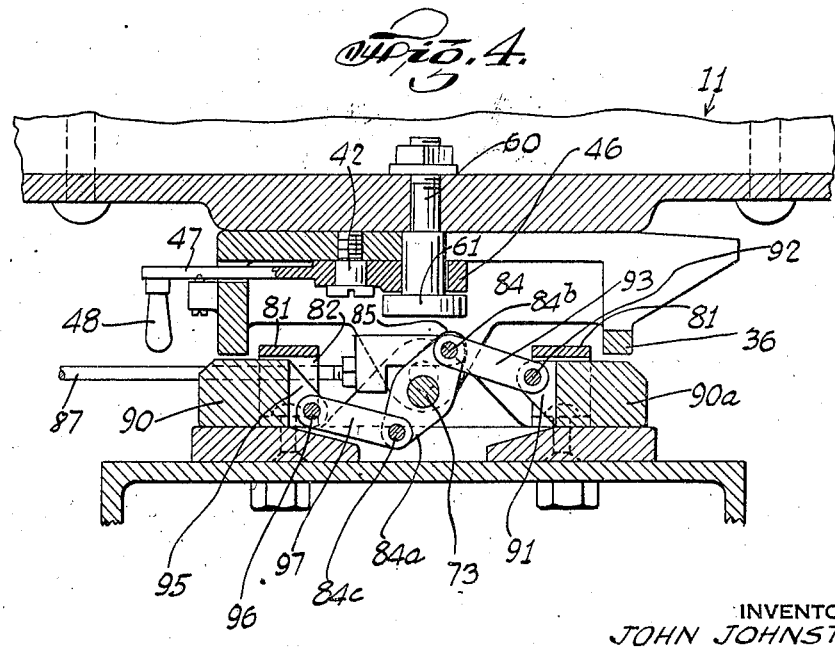
Fig. 4 is a view similar to Fig. 1, but showing the parts in position to prevent tilting.

It will now be understood that when the connecting rod 87 is pulled forwardly, the blocks 90, 90a are pulled inwardly toward each other. In such position, the trailer may tilt relative to the truck. When it is desired to turn the truck relative to the trailer, the rod 87 is first pushed rearwardly to the position shown in Fig. 4 of the drawings, causing the blocks 90, 90a to slide outwardly, so as to be disposed beneath the flanges 30, 36. In such position, the trailer cannot tilt because said flanges would contact the blocks 90, 90a.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. In combination, a base, a member pivoted to the base, said member being formed with a pair of depending flanges, a pair of parallel brackets mounted on the base, blocks slidably mounted within said brackets, a second pair of brackets on the base and carrying a horizontal shaft parallel to said first brackets and base and disposed between said blocks, a lever on said shaft, a link interconnecting one end of the lever to one of said blocks and a link interconnecting the other end of said lever to the other block, and means to rotate said shaft to move the blocks in opposite directions beneath said flanges.

2. Means to prevent tilting of a trailer relative to a truck, including a pair of brackets adapted to be mounted on the truck, a pair of blocks slidably mounted within said brackets and movable toward and away from each other, means to support a horizontal shaft between said blocks, a lever on said shaft, a link interconnecting one side of said lever with one of said blocks, and a second link interconnecting the other side of said lever with the other block, and a member adapted for connection to said trailer and pivoted to said base about an axis parallel to said shaft, and having means adapted to be engaged by said blocks when said blocks are spread apart by rotation of said shaft in one direction.

3. Means to prevent tilting of a trailer relative to a truck, including a pair of brackets adapted to be mounted on the truck, a pair of blocks slidably mounted within said brackets and movable toward and away from each other, means to support a horizontal shaft between said blocks, a lever on said shaft, a link interconnecting one side of said lever with one of said blocks, a second link interconnecting the other side of said lever with the other block, a member adapted for connection to said trailer and pivoted to said base about an axis parallel to said shaft, and having means adapted to be engaged by said blocks when said blocks are spread apart by rotation of said shaft in one direction, an arm on said shaft, and a pull rod attached to said arm for rotating said shaft.

4. In combination, a base adapted to be fixed to a truck, having pairs of parallel upstanding bosses formed with aligned openings carrying transverse aligned horizontal pivot pins, a member comprising a top plate having depending apertured ears extending between said pairs of parallel bosses and receiving said pivot pins, said member being formed with a pair of depending flanges, a pair of parallel brackets on said base, blocks slidably mounted in said brackets, a horizontal shaft mounted on said base and between said blocks, a pair of levers on said shaft, links interconnecting said levers with said blocks, and a connecting rod connected to said shaft to rotate said levers.

5. In combination, a base adapted to be fixed to a truck, having pairs of parallel upstanding bosses formed with aligned openings carrying aligned horizontal pivot pins, a member comprising a top plate having depending apertured ears extending between said pairs of parallel bosses and receiving said pivot pins, said member being formed with a pair of depending flanges, a pair of parallel brackets on said base, blocks slidably mounted in said brackets, a horizontal shaft mounted on said base and between said blocks, a pair of levers on said shaft, links interconnecting said levers with said blocks, an arm on said shaft, and a connecting rod connected to said arm to rotate said levers, said blocks being adapted when moved inwardly toward each other to clear said flanges, and when moved outwardly away from each other, to engage beneath said flanges.

JOHN JOHNSTON.